United States Patent [19]

Ogawa et al.

[11] Patent Number: 5,425,988

[45] Date of Patent: Jun. 20, 1995

[54] RECORDING AND REPRODUCING DEVICE WHICH INCLUDES A PROTECTIVE FILM AND A MONOMOLECULAR FLUORO ORGANO SILICON FILM

[75] Inventors: Kazufumi Ogawa; Norihisa Mino, both of Osaka; Toshinobu Ishihara, Joetsu; Mikio Endo, Joetsu; Tohru Kubota, Joetsu; Yasuhisa Tanaka, Yokohama, all of Japan

[73] Assignees: Matsushita Electrical Industrial Co., Ltd., Osaka; Shin-Etsu Chemical Co., Ltd., Tokyo, both of Japan

[21] Appl. No.: 127,288

[22] Filed: Sep. 27, 1993

Related U.S. Application Data

[63] Continuation of Ser. No. 753,523, Sep. 3, 1991, abandoned.

[30] Foreign Application Priority Data

Sep. 7, 1990 [JP] Japan .................................. 2-237532

[51] Int. Cl.[6] .............................................. G11B 5/00
[52] U.S. Cl. ...................................... 428/333; 428/338; 428/421; 428/422; 428/447; 428/448; 428/450; 428/694 TF; 428/900; 360/122; 360/134; 360/135
[58] Field of Search ............... 428/333, 421, 422, 447, 428/448, 450, 694, 695, 900, 694 TF, 338; 360/122, 134, 135

[56] References Cited

U.S. PATENT DOCUMENTS

| | | | |
|---|---|---|---|
| 4,120,995 | 10/1978 | Phipps et al. | 427/248 A |
| 4,152,487 | 5/1979 | Yanagisawa | 428/621 |
| 4,529,659 | 7/1985 | Hoshino et al. | 428/422 |
| 4,583,145 | 4/1986 | Monnich et al. | 360/135 |
| 4,902,585 | 2/1990 | Ogawa et al. | 428/694 |
| 4,992,316 | 2/1991 | Ogawa | 428/64 |
| 5,001,963 | 4/1991 | Ogawa et al. | 556/485 |

FOREIGN PATENT DOCUMENTS

| | | |
|---|---|---|
| 0282188 | 9/1988 | European Pat. Off. . |
| 0326438 | 8/1989 | European Pat. Off. . |
| 0363924 | 4/1990 | European Pat. Off. . |
| 2554625 | 5/1985 | France . |

OTHER PUBLICATIONS

Copy of Communication from European Patent Office dated Sep. 15, 1993.
Search Report re EPA No. 91114994.6 dated Dec. 18, 1991.

*Primary Examiner*—Stevan A. Resan
*Attorney, Agent, or Firm*—Panitch Schwarze Jacobs & Nadel

[57] ABSTRACT

A recording and reproducing device is provided. The device comprises a recording medium, a head giving and receiving recording signals to or from the recording medium, and a mechanism section and a circuit section giving and receiving the recording signals, wherein at least one protective film, and at least one fluorine-containing monomolecular film are formed in this order on the recording layer of the recording medium or on the surface of the head which comes into contact with said recording layer, wherein said protective film is a metal film, oxidized metal film, semi-conductor film, oxidized semi-conductor film, or organic monomolecular film, and wherein said fluorine-containing monomolecular film is formed by the chemical adsorption of a specific-type of silane compound that contains a perfluoroalkyl group at the molecular end on the surface of the protective film.

3 Claims, 4 Drawing Sheets

RECORDING AND REPRODUCING DEVICE WHICH INCLUDES A PROTECTIVE FILM AND A MONOMOLECULAR FLUORO ORGANO SILICON FILM

This is a continuation of U.S. patent application Ser. No. 07/753,523, filed Sep. 3, 1991, now abandoned.

BACKGROUND OF THE INVENTION

1. Field of the Invention:

The present invention relates to a recording and reproducing device. In particular, the present invention relates to a recording and reproducing device having a recording medium, or a recording and/or reproducing head with excellent lubricity and durability.

2. Description of the Prior Art:

Recording and reproducing devices comprise a recording medium, a recording and/or reproducing head giving and receiving recording signals to or from the recording medium, and a mechanism section and a circuit section giving and receiving the recording signals. The recording media include for example magnetic tapes, magnetic discs, magnetic cards, optical magnetic discs, and the like. The recording and/or reproducing heads include for example VTR heads which record analog signals, magnetic recording heads for magnetic discs which record and erase digital signals, optical magnetic recording heads, optical heads, and the like.

Among these recording media described above, the magnetic recording medium is mainly classified into a coated type, and a vacuum evaporation type, depending on its preparation procedure.

The coating type-magnetic recording medium is generally prepared by mixing a magnetic powder such as $Fe_2O_3$, or a mixture of $\gamma$-$Fe_2O_3$ and Co, etc., with a mixture of poly (vinyl butyral), toluene, and methylisobutylketone, and the like, and dispersing it therein to form a paint; and coating the paint on the surface of the base plate of the recording medium at a 4–5 $\mu$m thickness. Although this coated type-magnetic recording medium is easy to make, it has unsatisfactory performances for a high density recording process because the particles of the magnetic powder are present in a dispersed state in a resin such as poly (vinyl butyral), and the particles of the magnetic powder cannot be made in a smaller size beyond a certain level.

The vacuum evaporation type-recording medium is prepared by vacuum-evaporating magnetic metals such as Fe—Ni, Ni—Co, etc., or oxidized magnetic metals on the surface of the base plate by the electron beam method, or the sputtering method in such a manner that the thickness of the vacuum-evaporation film will be 1,000–2,000 angstroms. Because the vacuum evaporation type-recording medium has magnetic metals or oxidized magnetic metals on the top surface, it has higher recording density compared to the coating type-recording medium. This advantage is offset in that the surface lacks lubricity and durability.

Therefore, the vacuum-evaporated surface of the recording medium described above is coated with silicon glass, or water glass, etc., and baked to form an overcoat layer followed by coating a lubricant which provides lubricity to the surface. However, the resulting magnetic recording medium still does not have sufficient durability. Moreover, the overcoat layer and the lubricant cannot be coated thinly and uniformly. Therefore, the distance between the head and the recording layer becomes large, thus the recording medium cannot utilize its own recording ability of high density. It provides only a recording density of 20 mega bits when a 5.25 inch-disc used.

Recording and/or reproducing heads are prepared, for example, by the following procedure. First, two or more magnetic films are formed in a prescribed form by vacuum evaporation on the surface of a ceramic base plate in the direction of its length. Next, another ceramic base plate is adhered to the vacuum-evaporated surface. Then, after the surface containing the interface line of the combined ceramic plates is polished until at least part of the magnetic films is exposed, the combined ceramic plate is cut into several pieces so that each piece has one magnetic film.

The polished surface of the head is the surface which comes into contact with a recording medium. The lubricity and anti-wear property of the head depends on the kind of the ceramics used, and the degree of polishing. No treatment has been made to improve its lubricity and anti-wear property. Therefore, conventional heads are not only susceptible to damaging the recording medium, but undergo significant wear, which provides poor reliability.

SUMMARY OF THE INVENTION

The recording and reproducing device of this invention, which overcomes the above-discussed and numerous other disadvantages and deficiencies of the prior art, comprises a recording medium, a head giving and receiving recording signals to or from said recording medium, and a mechanism section and a circuit section giving and receiving the recording signals, wherein at least one protective film, and at least one fluorine-containing monomolecular film are formed in this order on the recording layer of the recording medium, or the surface of the head which comes into contact with the recording layer, wherein said protective film is a metal film, oxidized metal film, semi-conductor film, oxidized semi-conductor film, or organic monomolecular film, and wherein said fluorine-containing monomolecular film is formed by the chemical adsorption of a silane compound represented by the following general Formula (I) on the surface of the protective film:

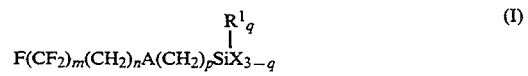
(I)

wherein $R^1$ is an alkyl group with 1 to 4 carbon atoms;

A is an oxygen atom (—O—), a carboxyl group

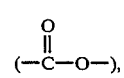

or a dialkylsilylene group

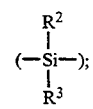

wherein each $R^2$ and $R^3$ is an alkyl group with 1 to 4 carbon atoms;

X is a halogen atom, or an alkoxyl group;
m is an integer from 1 to 8;
n is an integer from 0 to 2;
p is an integer from 5 to 25; and
q is an integer from 0 to 2.

In a preferred embodiment, a monomolecular film of silane compound is present between the protective film and the fluorine-containing monomolecular film, and the monomolecular film of silane compound is chemically bonded to the protective film and the fluorine-containing monomolecular film.

Thus, the invention described herein makes possible the objectives of (1) providing a recording and reproducing device which comprises a recording medium having a magnetic layer, the surface of which has excellent lubricity and anti-wear properties, and/or a recording or reproducing head, the surface of which coming into contact with the recording medium, has excellent lubricity and anti-wear properties; (2) providing a recording and reproducing device which comprises a recording medium and/or a head with a thin film formed on its surface for the purpose of providing the above-mentioned lubricity and anti-wear properties; (3) providing a recording and reproducing device which comprises a vacuum evaporation type-magnetic recording medium having the above-mentioned thin film on the surface of the medium, and can perform high density recording; and (4) providing a recording and reproducing device which comprises a head with the above-mentioned thin film formed on the surface of the head which comes into contact with a recording medium, and the head has durability and reliability and causes little damage to the recording medium.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
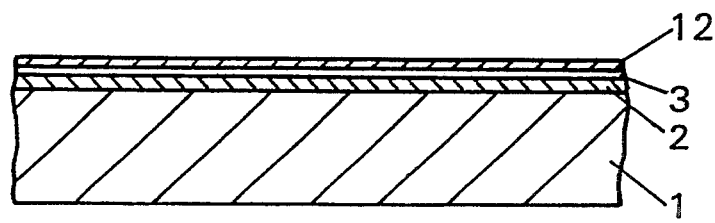
FIG. 1 shows a schematic cross-sectional view of the recording medium of the recording and reproducing device of this invention.

The recording and reproducing device of this invention comprises a recording medium, a recording and/or reproducing head giving and receiving recording signals to or from the recording medium, and a mechanism section and a circuit section giving and receiving the recording signals. As shown in FIG. 1, the recording medium is formed by layering a magnetic recording layer 2, a protective film 3 and a fluorine-containing monomolecular film 12 on a base plate 1 in this order. The magnetic recording layer 2 is a magnetic metal film made of Fe—Ni, Ni—Co, etc., or an oxidized magnetic metal film, and is about 1,000 angstrom in thickness. The magnetic recording layer 2 can be formed by the sputtering method, or the conventional coating method. The protective film 3 formed on the magnetic recording layer 2 is a nonmetal inorganic film, a metal film, an oxidized metal film, a semi-conductor film, an oxidized semi-conductor film, or an organic monomolecular film. The nonmetal materials forming the protective film 3 include for example carbon, and the like. The metals and the oxidized metals include, for example, Cr, Mn, W, Mo, Ti, and oxidized materials thereof, and the like. The semi-conductive materials, and the oxidized semi-conductive materials include, for example, Si, SiC, $SiO_2$, $Si_3N_4$, and the like. The organic monomolecular films include those formed by using long chain silane coupling agents. The fluorine-containing monomolecular film is formed by the specific-type of fluorine-containing silane compounds described below.

Figure 2:
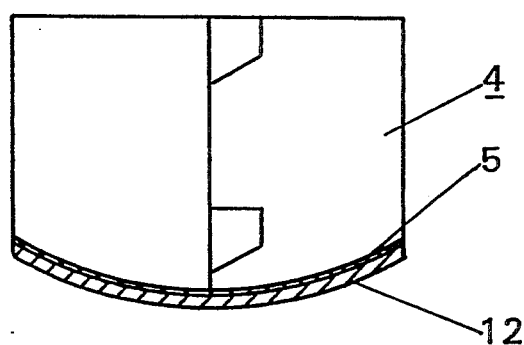
FIG. 2 shows a schematic cross-sectional view of the recording and/or reproducing head of the recording and reproducing device of this invention.
Figure 3:
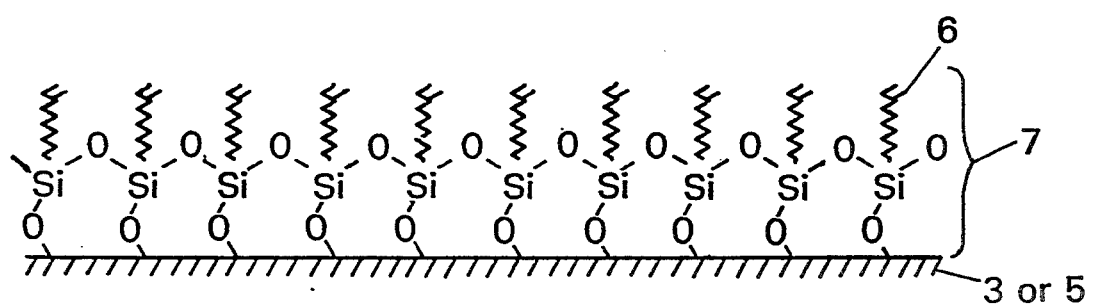
FIGS. 3 to 7 show a process for preparing a fluorine-containing monomolecular film on the surface of the recording medium, or the head of the recording and reproducing device of this invention.
Figure 4:
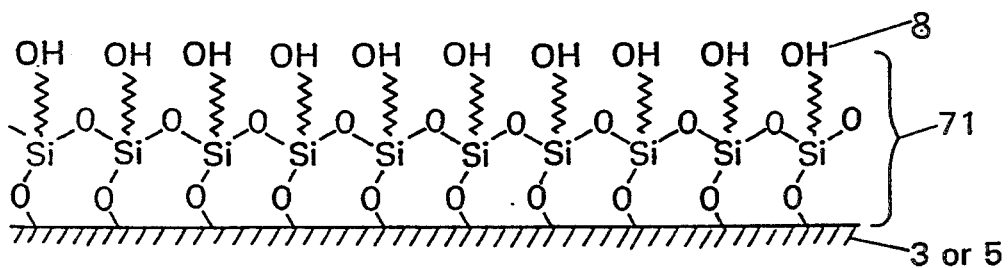

The head, for example, has the structure shown in FIG. 2. The head comprises a head body 4, a protective film 5 coated on the surface of the head body 4 which comes into contact with the aforementioned recording medium, and a fluorine-containing monomolecular film 12 layered on the surface of the protective film 5. The same materials as are used for the protective film 3 of the recording medium described above can be used for the protective film 5 of the head.

The fluorine-containing monomolecular film 12 is formed by the chemical adsorption of the silane compound represented by the following general Formula (I) on the protective film 3 or 5:

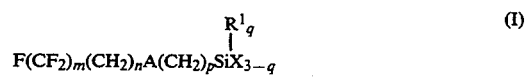

$$F(CF_2)_m(CH_2)_nA(CH_2)_pSiX_{3-q} \quad \overset{R^1_q}{|} \qquad (I)$$

wherein
$R^1$ is an alkyl group with 1 to 4 carbon atoms;
A is an oxygen atom (—O—), a carboxyl group

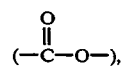

$$(-\overset{O}{\underset{\|}{C}}-O-),$$

or a dialkylsilylene group

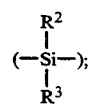

$$\begin{matrix} R^2 \\ | \\ (-Si-); \\ | \\ R^3 \end{matrix}$$

wherein
each $R^2$ and $R^3$ is an alkyl group with 1 to 4 carbon atoms;
X is a halogen atom, or an alkoxyl group;
m is an integer from 1 to 8;
n is an integer from 0 to 2;
p is an integer from 5 to 25; and
q is an integer from 0 to 2.

The compound can be obtained by a hydrosilylation reaction in which an alkene compound represented by the following general Formula (II):

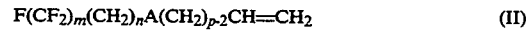

$$F(CF_2)_m(CH_2)_nA(CH_2)_{p-2}CH=CH_2 \qquad (II)$$

wherein A, m, n and p are as defined hereinbefore in Formula (I), is reacted with a silicon compound represented by the following general Formula (III):

$$HSiX_{3-q}R^1{}_q \quad (III)$$

wherein $R^1$, X, and q are as defined hereinbefore in Formula (I).

Examples of the alkene compound (i.e., a terminal fluoroalkene compound) represented by the above-described Formula (II) which is a raw material for preparing the compound (I) include the following compounds:

$$CF_3(CH_2)_2\underset{\underset{CH_3}{|}}{\overset{\overset{CH_3}{|}}{Si}}(CH_2)_{13}CH=CH_2$$
(15-(trifluoropropyldimethylsilyl)pentadecene), $$C_4F_9(CH_2)_2\underset{\underset{CH_3}{|}}{\overset{\overset{CH_3}{|}}{Si}}(CH_2)_7CH=CH_2$$
(9-(nonafluorohexyldimethylsilyl)nonene), $CF_3CH_2O(CH_2)_{13}CH=CH_2$
(15-trifluoroethoxy)pentadecene), and $CF_3COO(CH_2)_{13}CH=CH_2$
(15-(trifluoroacetoxy)pentadecene).

Examples of the silicon compounds represented by the above-described Formula (III) include the following compounds:

$HSiCl_3$ (trichlorosilane), $HSiCl_2$
$|$
$CH_3$
(methyldichlorosilane), $HSiCl$
$|$
$(CH_3)_2$
(dimethyldichlorosilane), $HSi(OCH_3)_3$ (trimethoxysilane),
and $HSi(OC_2H_5)_2$
$|$
$CH_3$
(methyldiethoxysilane).

The following are the examples of the terminal fluoroalkene compounds represented by the above-described Formula (I), which can be obtained by reacting the terminal fluoroalkene compound with the silicon compounds as described below.

$$CF_3(CH_2)_2\underset{\underset{CH_3}{|}}{\overset{\overset{CH_3}{|}}{Si}}(CH_2)_{15}SiCl_3$$
(15-(trifluoropropyldimethylsilyl)pentadecyl-trichlorosilane), -continued $$C_4F_9(CH_2)_2\underset{\underset{CH_3}{|}}{\overset{\overset{CH_3}{|}}{Si}}(CH_2)_9SiCl_2$$
$|$
$CH_3$
(9-(nonafluorohexyldimethylsilyl)nonylmethyl-dichlorosilane), $CF_3CH_2O(CH_2)_{15}Si(OCH_3)_3$
(15-(trifluoroethoxy)pentadecyltrimethoxysilane), and $CF_3COO(CH_2)_{15}\underset{\underset{CH_3}{|}}{Si}(OC_2H_5)_2$
(15-(trifluoroacetoxy)pentadecylmethyldiethoxysilane).

For example, the above-described $$CF_3(CH_2)_2\underset{\underset{CH_3}{|}}{\overset{\overset{CH_3}{|}}{Si}}(CH_2)_{15}SiCl_3$$

can be obtained by the following procedure:

A relatively inexpensive industrial raw material, $CF_3(CH_2)_2SiCl_2$ (or $CF_3(CH_2)_2Si(OCH_3)_2$)

is reacted with a general methylation agent to form an intermediate, $$CF_3(CH_2)_2\underset{\underset{CH_3}{|}}{\overset{\overset{CH_3}{|}}{Si}}Cl \quad (or \; CF_3(CH_2)_2\underset{\underset{CH_3}{|}}{\overset{\overset{CH_3}{|}}{Si}}OCH_3)$$

followed by the reaction of the intermediate with a Grignard reagent derived from $CH_2=CH(CH_2)_{13}Cl$ (pentadecenylchloride) to form $$CF_3(CH_2)_2\underset{\underset{CH_3}{|}}{\overset{\overset{CH_3}{|}}{Si}}(CH_2)_{13}CH=CH_2.$$

Then, the resulting product is further reacted with $HSiCl_3$ under the presence of a catalyst in a hydrosilylation reaction.

This hydrosilylation reaction is conducted by reacting a terminal fluoroalkene compound with a silicon compound under the presence of a catalyst such as a platinum catalyst at the reaction temperature of 50° to 150° C. The reaction proceeds at reflux under atmospheric pressure, or in a sealed autoclave under superatmospheric pressure. Equivalent amounts of the terminal fluoroalkene compound and the silicon compound can be reacted, or an excess amount of the silicon compound can optionally be reacted with the terminal fluoroalkene compound. The terminal fluoroalkene compound is more expensive, thus the use of an excess amount of the silicon compound is desirable to react the terminal fluoroalkene compound completely with the silicon compound. The reaction mentioned above is conducted in the absence of solvent, or in the presence of an unreactive solvent, including hydrocarbon solvents such as n-hexane, iso-octane, toluene, xylene, and the like as needed.

After the reaction is completed, highly volatile materials such as solvents and the unreacted compounds are stripped from the reaction mixture to obtain a crude compound (I). The crude compound (I) is pure enough to utilize, but if possible it may be distilled for purification.

Using the resulting compound (I), the fluorine-containing monomolecular film is formed by the following procedure. First, a protective film is formed on the surface of a magnetic recording layer which has been formed on a base plate, or on the surface of a head body. Then, the protective film is optionally oxidized, thereby having hydrophilic groups such as —OH, —NH$_2$, etc., being formed on its surface. The base plate or the head having such functional groups (i.e., hydrophilic groups) is immersed into a solution of the compound (I) in an organic solvent. The organic solvents include n-hexane, chloroform, carbon tetrachloride, or the like. The solution can also be applied on the base plate by spraying or casting instead of immersing. The immersed, casted, or spray-treated magnetic recording base plate or head is allowed to stand at room temperature, or treated by heating.

The treatment proceed with the reaction between the functional group and the —Si—X portion of the compound (I), and the compound is bonded to the surface of the base plate through a siloxane bond (i.e., the compound (I) is adsorbed chemically), thereby forming a monomolecular film.

Alternatively, it is possible to form a monomolecular film on the surface of the protective film by the use of a chemical adsorbent having an unsaturated bond at its one end, then the unsaturated bond is converted into —OH group, NH$_2$ group, etc., and then the aforementioned compound (I) is adsorbed thereon chemically.

Since the compound (I) contains a fluoroalkyl group in its terminal portion, the molecules of the compound (I) become aligned such that surface of the resulting monomolecular film has the fluorine atoms aligned together on the outermost surface. Therefore, a monomolecular film with lubricity in addition to durability can be formed on the surface of the magnetic recording medium or the head.

The compound (I) contains at least one hetero atom or hetero group such as an oxygen atom, carboxyl group, dialkylsilylene group, or the like in its molecular chain. Therefore, when it is chemically adsorbed to the surface of the base plate, the resulting monomolecular film will have higher lubricity and durability because the degree of freedom of the molecules becomes high.

Since the fluorine-containing monomolecular film is formed extremely thin in a uniform thickness without any pinholes, it causes neither the reduction of efficiency of the recording medium or the head, nor the production of significant noise. The monomolecular film is chemically bonded to the recording medium or the head. Also, when two or more monomolecular films are layered as described above, the monomolecular films are chemically bonded to each other. Therefore, the recording medium with the fluorine-containing film maintains its own high density recording performances. Consequently, the recording and reproducing device having the recording medium, or the recording and/or the reproducing head performs high density recording and reproducing, and has excellent durability.

The present invention is characterized by the recording medium or the head having specific-type of fluorine-containing monomolecular film. Therefore it is to be understood that the mechanism section which operate the recording medium of the recording device, and the circuit section for recording and reproducing processes are not particularly limited.

The following illustrate the examples of the invention referring to FIGS. 1 to 9.

EXAMPLES

Example 1

As shows in FIG. 1, a magnetic recording layer 2 (for example, magnetic metal film such as Fe—Ni film, Ni—Co film, etc., or oxidized magnetic metal film) is formed on the base plate for a magnetic recording disc with a 1,000 angstrom thickness by the sputtering method or the like. Then, a protective film 3 is formed on the magnetic recording layer 2 with about a 200 angstrom thickness by the sputtering method. The protective films include for example inorganic films of nonmetals such as carbon, etc., metal films made of Cr, Mn, W, Mo, Ti, etc., oxidized metal films made of $Cr_2O_3$, $MnO_2$, $WO_3$, $Mo_2O_3$, $Ti_2O_3$, etc., semiconductor films made of Si, SiC, etc., and oxidized semiconductor films made of $SiO_2$, etc. When the $SiO_2$ protective film is formed, $SiO_2$ may be vacuum-evaporated directly on the magnetic recording layer, or an organic Si compound may be coated on the magnetic recording layer, and then treated by heat to modify the compound into $SiO_2$. The base plate having the protective film may optionally be oxidized. For example, the base plate is exposed for about 10 minutes to the oxygen-containing plasma gas, or the gas containing about 10% ozone which is obtained from an ozone producer, thereby oxidizing the surface of the protective film to form a hydrophilic surface. The formation of the hydrophilic surface facilitates the complete chemical adsorption which will be described below.

Then, the following silane compound having an unsaturated bond is chemically adsorbed to the protective film, as described below:

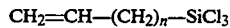

$$CH_2=CH-(CH_2)_n-SiCl_3$$

wherein n is an integer, and the silane compounds when n is about 10-20 are most preferred because of easy handling.

First, the aforementioned silane compound is dissolved into a mixed solvent containing 80% of n-hexadecane, 12% of carbon tetrachloride, and 8% of chloroform in a concentration of about $3 \times 10^{-3}$ to about $5 \times 10^{-2}$ mol/l. Then, the base plate having the recording layer and the protective film is immersed into the solution, thereby reacting the chlorosilyl groups of the silane compound with the hydroxyl groups present on the surface of the protective film. Thus, the silane compound is bonded to the protective film through a siloxane bond, and a single layer of monomolecular film 7 which has vinyl groups ($CH_2=CH-$) 6 is formed on the surface of the protective film (See FIG. 3). The monomolecular film 7 has about a 20–30 angstrom thickness.

Figure 5:
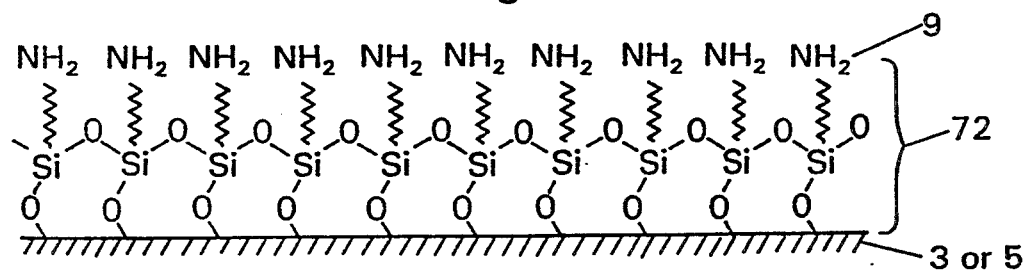

Then, the base plate is irradiated with about 3 Mrad of an energy beam such as an electron beam, X-ray, γ-ray, ultraviolet ray, or ion beam under oxygen or $N_2$ atmosphere to modify the vinyl groups 6 into hydroxyl groups 8 (—OH) (FIG. 4) or amino groups (—NH$_2$) 9 (FIG. 5). The modification of the vinyl groups into the hydroxyl groups or the amino groups is identified by the FTIR analysis. Also, the vinyl groups can be modified by treating with a plasma that contains O$_2$ or N$_2$ into the —OH groups or —NH$_2$ groups. In this way, a monomolecular film 71 (FIG. 4) or 72 (FIG. 5) can be formed.

Figure 6:
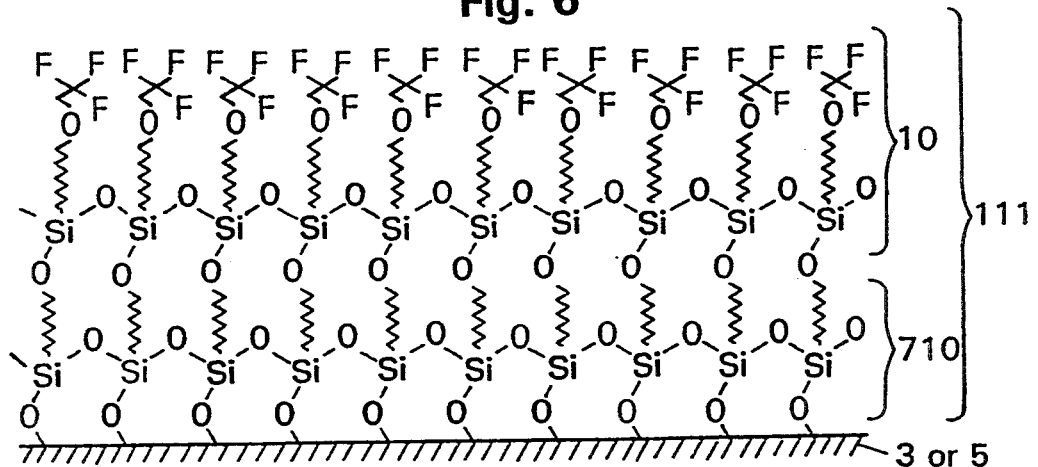
Figure 7:
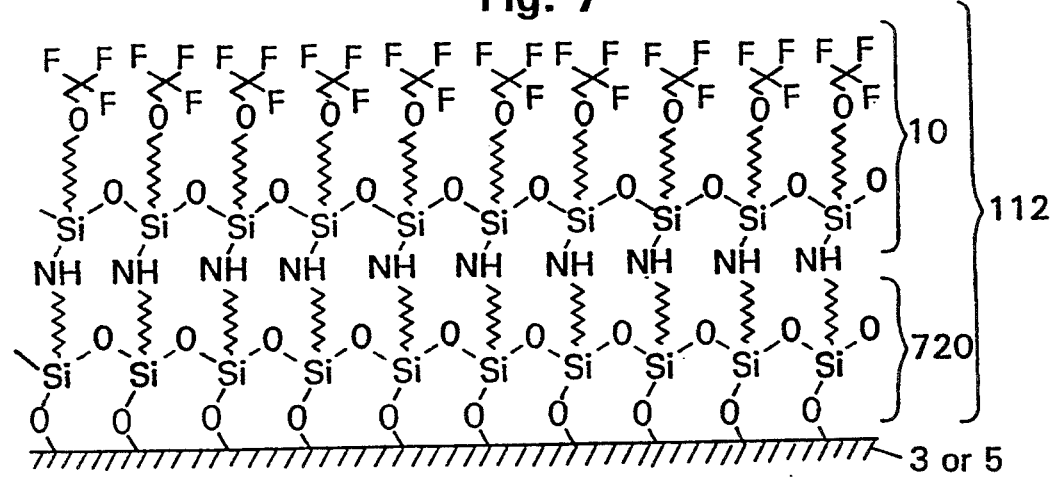

Then, another monomolecular film is formed by using the fluorine-containing silane compound represented by Formula (I), e.g., CF$_3$CH$_2$O(CH$_2$)$_{15}$SiCl$_3$ as follows. First, the fluorine-containing silane compound is dissolved into a mixed solvent of 80% of n-hexadecane, 12% of carbon tetrachloride, and 8% of chloroform in a concentration of about $2\times 10^{-3}$ to about $5\times 10^{-2}$ mol/l. The base plate having the monomolecular film 71 or 72 is then immersed into the solution, thereby reacting the chlorosilyl groups of the fluorine-containing silane compound with the —OH groups or —NH$_2$ groups of the protective film to form —Si—O— bonds or —Si—NH— bonds as shown in FIGS. 6 or 7.

Thus, a recording medium having a multi-monomolecular film 111 or 112 which comprises a fluorine-free monomolecular film 710 or 720, and a fluorine-containing monomolecular film 10 layered on the fluorine-free monomolecular film 710 or 720 (FIGS. 6 or 7) can be obtained. The monomolecular film 710 or 720 is chemically bonded to the monomolecular film 10.

Although in the above-described example, the fluorine-containing monomolecular film is layered on the fluorine-free monomolecular film containing functional groups such as —NH$_2$, —OH, etc., which is also layered on the protective layer, it is possible to form the fluorine-containing monomolecular film on the protective film, directly.

Also, a laminated monomolecular film which comprises two or more monomolecular films and has fluorine-containing groups on its surface can be obtained by the following procedure. First, an unsaturated fluorine-free silane compound such as CH$_2$=CH—(CH$_2$-)$_n$—SiCl$_3$ is adsorbed chemically to the protective film, and then the adsorbed compound is irradiated with an energy beam. After this process is repeated several times, a fluorine-containing silane compound is adsorbed chemically to the irradiated surface.

Also, a fluorine-containing monomolecular film can be formed on the surface of the head as shown in FIG. 2 instead of the aforementioned recording medium.

Additionally, the following compounds can be utilized as the fluorine-containing silane compound as well as CF$_3$CH$_2$O(CH$_2$)$_{15}$SiCl$_3$:
CF$_3$(CH$_2$)$_2$Si(CH$_3$)$_2$(CH$_2$)$_{15}$SiCl$_3$,
F(CF$_2$)$_4$(CH$_2$)$_2$Si(CH$_3$)$_2$(CH$_2$)$_9$SiCl$_3$, or
CF$_3$COO(CH$_2$)$_{15}$SiCl$_3$.

Example 2

Figure 8:
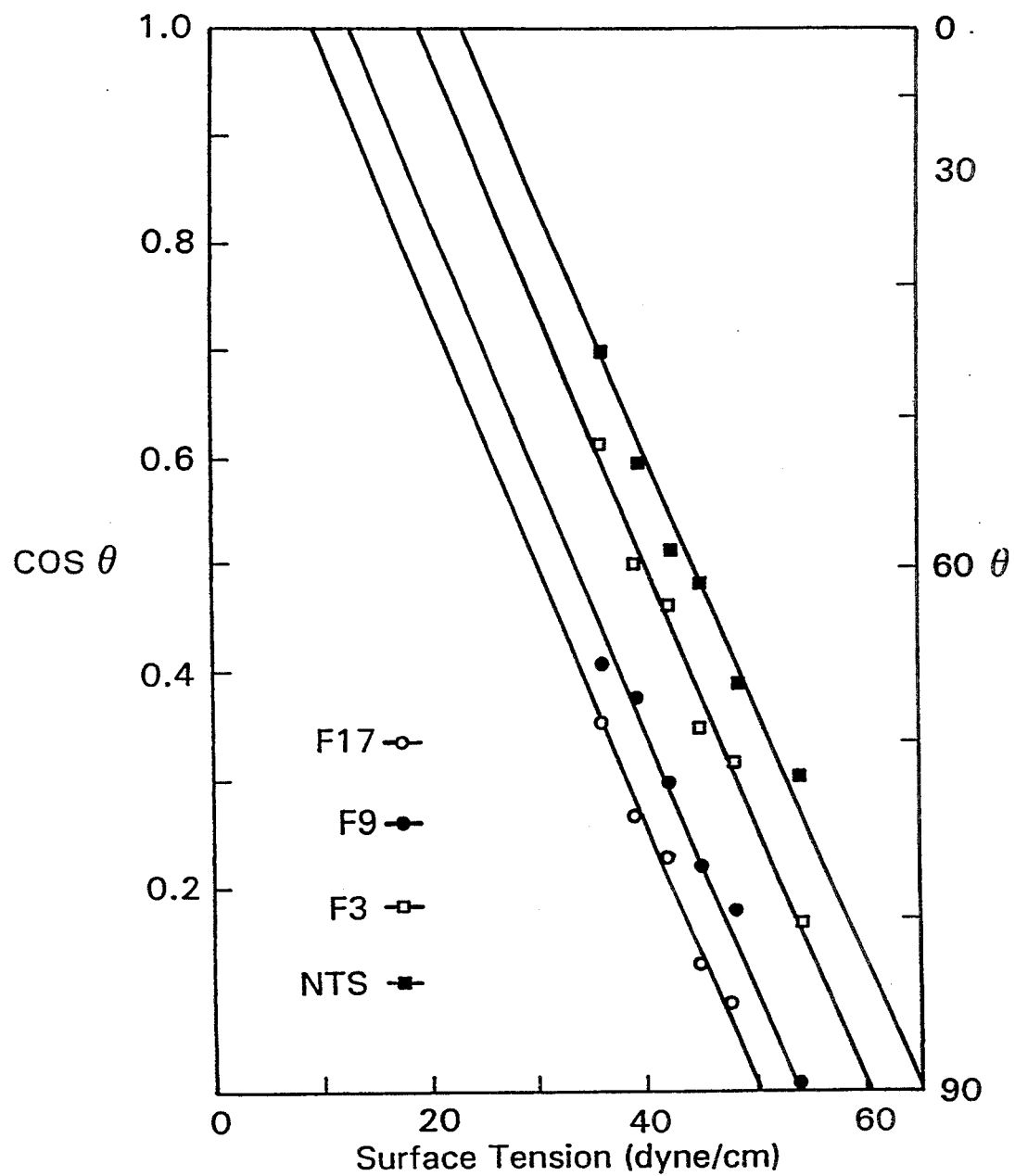
FIG. 8 is a graph which shows the results of determining the surface energy of fluorine-containing chemical adsorption films and a fluorine-free conventional chemical adsorption film.

The following various fluorine-containing silane compounds, and fluorine-free silane compound are adsorbed on the surface of a base plate to form monomolecular films. Then, the surface energy of the resulting monomolecular films is measured. FIG. 8 shows the result of the measurement.

In FIG. 8, the plots of F17, F9, F3 and NTS show the measured values of the monomolecular films prepared by using the following compounds, respectively. The surface tension is measured at different angles $\theta$. The surface energy of the monomolecular film corresponds to the surface tension when the angle $\theta$ is zero.

F17: F(CF$_2$)$_8$Si(CH$_3$)$_2$(CH$_2$)$_9$SiCl$_3$,
F9: F(CF$_2$)$_4$(CH$_2$)$_2$O(CH$_2$)$_{15}$SiCl$_3$,
F3: CF$_3$COO(CH$_2$)$_{15}$SiCl$_3$, and
NTS: CH$_3$(CH$_2$)$_{19}$SiCl$_3$.

It can be seen from FIG. 8 that when the number of fluorine atoms contained in the compound increases, the surface energy of the resulting monomolecular film will decrease.

Example 3

Figure 9:
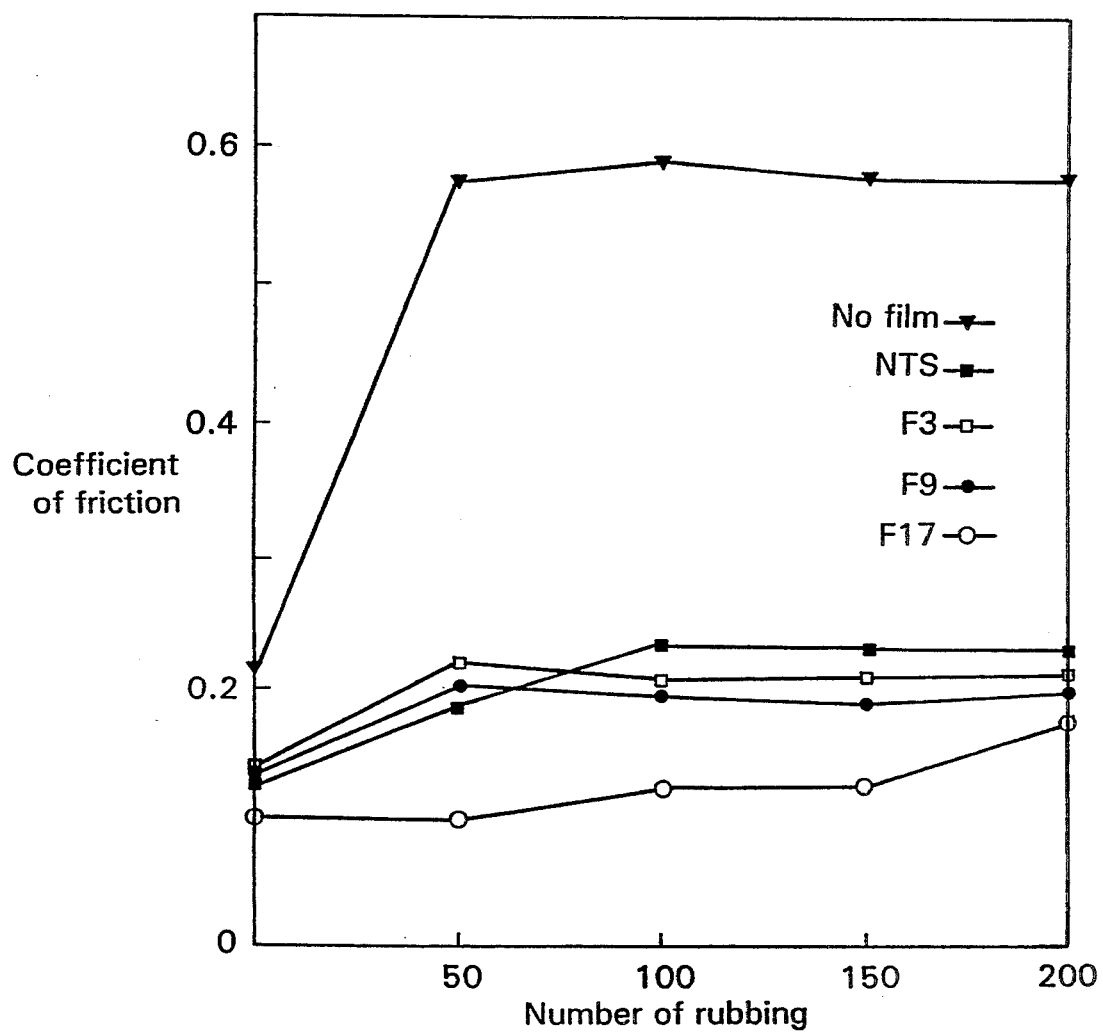
FIG. 9 is a graph showing the coefficient of friction of fluorine-containing chemical adsorption films and a fluorine-free conventional chemical adsorption film, when the films are rubbed for predetermined times.

A protective film (i.e., SiO$_2$ film), and a monomolecular film are formed according to the procedure of Example 1. Anti-wear property of the monomolecular film is estimated by using a friction test machine manufactured by Kyowa Kaimen Kagaku Co., Ltd. FIG. 9 shows the results of the estimation.

As can be seen from FIG. 9, the monomolecular film obtained from the compound (I) containing more fluorine atoms has a lower coefficient of friction, which indicates higher anti-wear property.

Although the aforementioned examples illustrate the formation of a fluorine-containing monomolecular film on the magnetic discs and magnetic heads, the fluorine-containing films are useful for other applications such as the improvement of the anti-wear property of optical recording media, laser heads for optical discs, disc needles, and the like, and the surface protection of other recording media and heads. The recording media and heads are used for VTR heads which record analog signals, digital signals, etc.; magnetic disc devices; optical magnetic disc devices; and the like.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A recording and reproducing device comprising a recording medium having a recording layer, a head giving and receiving recording signals to or from said recording medium, and a mechanism section and a circuit section giving and receiving said recording signals, wherein at least one protective film, and at least one fluorine-containing monomolecular film are formed in this order on said recording layer of said recording medium or on the surface of said head which comes into contact with said recording layer, wherein said protective film is a nonmetal inorganic film, a metal film, oxidized metal film, semi-conductor film, oxidized semi-conductor film, or organic monomolecular film, and wherein said fluorine-containing monomolecular film is formed by the chemical adsorption of a silane compound represented by the following general formula (I) on the surface of said protective film:

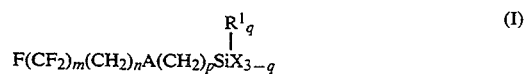

wherein $R^1$ is an alkyl group with 1 to 4 carbon atoms; A is an oxygen atom (—O—), a carboxyl group

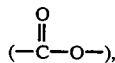

or a dialkylsilylene group

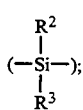

wherein each $R^2$ and $R^3$ is an alkyl group with 1 to 4 carbon atoms;
X is a halogen atom, or an alkoxyl group;
m is an integer from 1 to 8;
n is 2;
p is an integer from 5 to 25; and
q is an integer from 0 to 2.

2. A recording and reproducing device of claim 1, wherein a monomolecular film of silane compound is present between said protective film and said fluorine-containing monomolecular film, and said monomolecular film of silane compound is chemically bonded to said protective film and said fluorine-containing monomolecular film.

3. A recording and reproducing device of claim 1, wherein said silane compound represented by Formula (I) is:

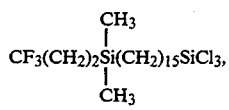

or

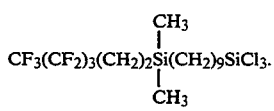

* * * * *